United States Patent
Foebel et al.

(10) Patent No.: US 10,838,958 B2
(45) Date of Patent: Nov. 17, 2020

(54) STATIC HIERARCHY BASED QUERY EXECUTION

(71) Applicant: SAP SE, Walldorf (DE)

(72) Inventors: Florian Foebel, Buerstadt (DE); Bjoern Friedmann, Rheinmuenster (DE); Boris Gruschko, Heidelberg (DE); Martin Strenge, Berlin (DE); Christian Mohr, Heidelberg (DE)

(73) Assignee: SAP SE, Walldorf (DE)

( * ) Notice: Subject to any disclaimer, the term of this patent is extended or adjusted under 35 U.S.C. 154(b) by 292 days.

(21) Appl. No.: 15/272,851

(22) Filed: Sep. 22, 2016

(65) Prior Publication Data

US 2018/0081941 A1 Mar. 22, 2018

(51) Int. Cl.
| | | |
|---|---|---|
| *G06F 16/2453* | (2019.01) | |
| *G06F 9/48* | (2006.01) | |
| *G06F 9/50* | (2006.01) | |
| *G06F 9/54* | (2006.01) | |
| *G06F 16/2455* | (2019.01) | |

(52) U.S. Cl.
CPC ...... *G06F 16/24542* (2019.01); *G06F 9/4881* (2013.01); *G06F 9/5066* (2013.01); *G06F 9/542* (2013.01); *G06F 9/546* (2013.01); *G06F 16/2455* (2019.01)

(58) Field of Classification Search
CPC ......... G06F 17/30283; G06F 17/30463; G06F 17/30575; G06F 9/546; G06F 9/542; G06F 9/54; G06F 16/2453; G06F 16/2455
See application file for complete search history.

(56) References Cited

U.S. PATENT DOCUMENTS

| | | | | |
|---|---|---|---|---|
| 7,984,151 B1* | 7/2011 | Raz | ............ | G06F 9/5083 709/223 |
| 2011/0302151 A1* | 12/2011 | Abadi | ............ | G06F 17/30445 707/714 |
| 2012/0185437 A1* | 7/2012 | Pavlov | ............ | G06F 17/30094 707/652 |
| 2015/0066157 A1* | 3/2015 | Karypis et al. | .... | G05B 19/0421 700/3 |
| 2017/0270162 A1* | 9/2017 | Lee | ............ | G06F 17/30498 |

* cited by examiner

*Primary Examiner* — Marc S Somers
(74) *Attorney, Agent, or Firm* — Mintz Levin Cohn Ferris Glovsky and Popeo, P.C.

(57) ABSTRACT

In one respect, there is provided a distributed database system that includes a global scheduler node and a first local scheduler node. The global scheduler node can be configured to generate an execution plan for a query requiring data stored at and/or managed by a first and a second worker node assigned to the first local scheduler node. The execution plan can include a first fragment having operations to be performed by the first and second worker node. The first local scheduler node can be configured to coordinate the execution of a portion of the first fragment of the execution plan by distributing, to the first and second worker node, operations included in the first fragment of the execution plan, and routing, between the first and second worker node, messages associated with executing the first fragment of the execution plan. Related methods and computer program products are also provided.

13 Claims, 8 Drawing Sheets

STATIC HIERARCHY BASED QUERY EXECUTION

FIELD

The present disclosure generally relates to database processing and, more specifically, to query execution in a distributed database system.

BACKGROUND

Data in a distributed database system is stored across a multitude of physically and/or logically distinct nodes. For example, data in a distributed database system may be stored on different computers. Alternately or additionally, data in a distributed database system may be managed by separate processes. As such, in order to fulfill a query in a distributed database system, multiple nodes are often required to perform one or more specific operations on the data stored at and/or managed by each individual node. For instance, a scheduler node can derive an execution plan setting forth the operations required to fulfill the query as well as the interdependencies amongst the operations. Meanwhile, one or more worker nodes can perform the operations assigned to each worker node in the execution plan. The nodes (e.g., scheduler and worker nodes) that are involved in the execution of the query can exchange messages (e.g., control messages) in order to coordinate the execution of the query pursuant to the execution plan.

SUMMARY

Methods, systems, and articles of manufacture, including computer program products, are provided for query execution. In some implementations of the current subject matter, there is provided a distributed database system. The distributed database system can include a global scheduler node implemented on at least one programmable processor and configured to perform operations that include generating an execution plan for a query that requires data stored at and/or managed by a first worker node and a second worker node, wherein the execution plan includes at least a first fragment having operations to be performed by the first worker node and the second worker node. The distributed database system can further include a first local scheduler node implemented on at least one programmable processor and configured to perform operations that include coordinating an execution of at least a portion of the first fragment of the execution plan. The coordinating can include: distributing, to the first worker node and the second worker node, operations included in the first fragment of the execution plan; and routing, between the first worker node and the second worker node, at least one message associated with the execution the first fragment of the execution plan.

In some variations, one or more of the features disclosed herein including the following features can optionally be included in any feasible combination. The query can further require data stored at and/or managed by a third worker node assigned to a second local scheduler node. As such, the global scheduler node can be further configured to distribute, to the second local scheduler node, a second fragment of the execution plan, and wherein the second local scheduler node is configured to coordinate the execution of the second fragment of the execution plan.

In some variations, the global scheduler node can have an established connection with at least the first local scheduler node, and wherein the first local scheduler node has an established connection with each of the first worker node and the second worker node. The at least one message between the first worker node and the second worker node can be routed via established connections with the first local scheduler node instead of a direct connection between the first worker node and the second worker node.

In some variations, the distributed database system can further include a second local scheduler node. The second local scheduler node can be a higher level local scheduler node and the first local scheduler node can be a lower level local scheduler node assigned to the second local scheduler node. As such, the global scheduler node can be configured to distribute the first fragment of the execution plan to the second local scheduler node. Meanwhile, the second local scheduler node can be configured to coordinate the execution of the first fragment by at least distributing, to the first local scheduler node, the portion of the first fragment of the execution plan.

In some variations, the global scheduler node, the first local scheduler node, the first worker node, and the second worker node can form a static hierarchy. As such, connections between the global scheduler node, the first local scheduler node, the first worker node, and the second worker node in the static hierarchy can be configured to remain open.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
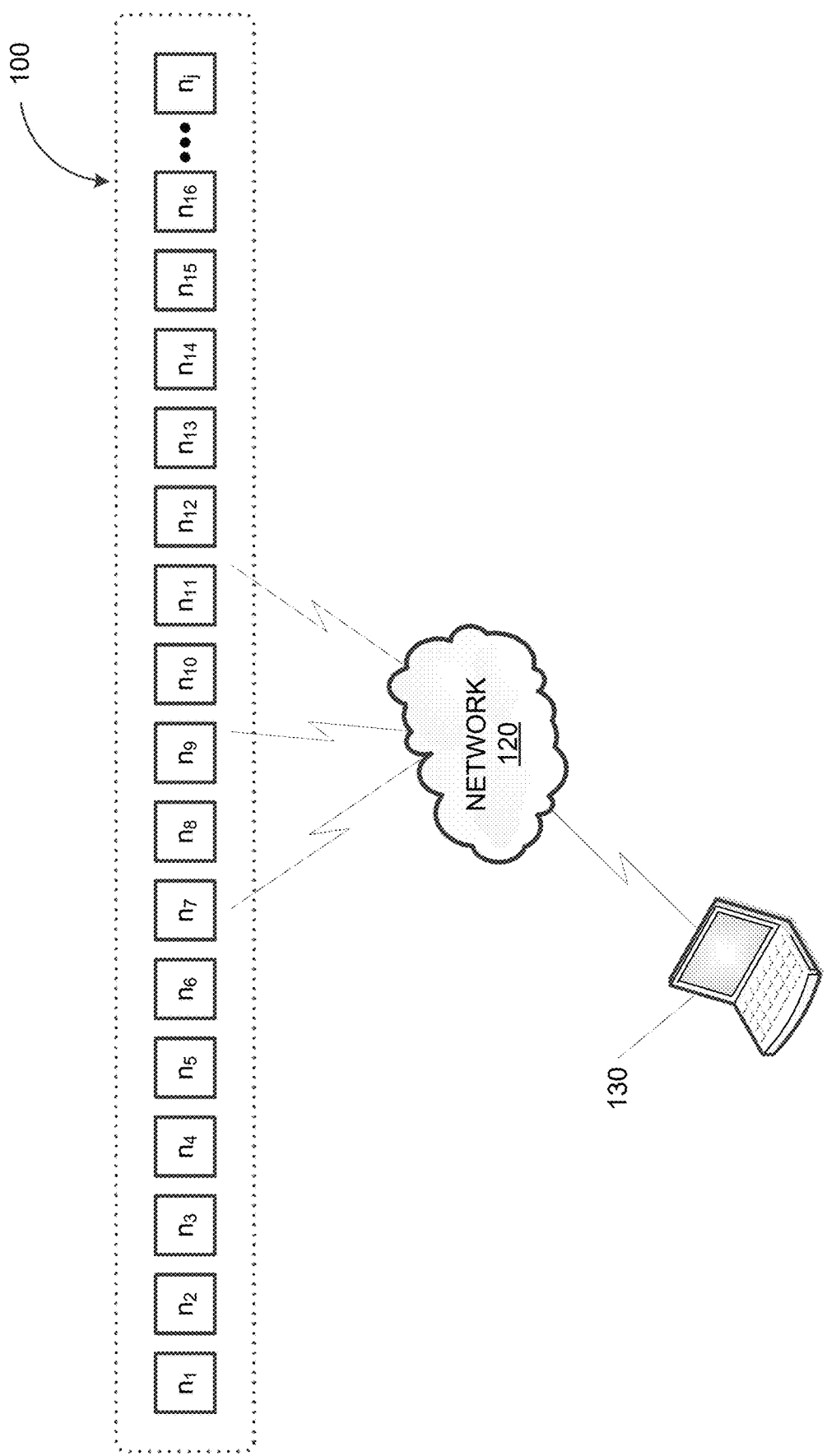
FIG. 1 depicts a network diagram illustrating a distributed database system consistent with implementations of the current subject matter.

Like labels are used to refer to same or similar items in the drawings.

DETAILED DESCRIPTION

As noted above, messages can be exchanged amongst multiple nodes in a distributed database system in order to coordinate the execution of a query in accordance with an execution plan. For example, the execution plan can include operations on data stored at and/or managed by different worker nodes. That is, several worker nodes may each be responsible for executing operations included in different portions or fragments of the execution plan. Thus, in order to respond to the query, the scheduler node typically establishes connections with multiple worker nodes. These connections can be used to distribute individual fragments of the execution plan to the appropriate worker nodes. Furthermore, additional connections can be established between various worker nodes for communicating updates between the worker nodes. But establishing a large number of connections at runtime can slow the execution of the query. Efforts to pool connections (e.g., across different queries) are often inefficient because resources can be used to maintain connections that are not necessarily reused when executing different queries.

In some implementations of the current subject matter, the nodes in a distributed database system can form a hierarchy that includes one or more global scheduler nodes, local scheduler nodes, and worker nodes. A global scheduler node can be configured to respond to a query by generating an execution plan and distributing fragments of that execution plan to one or more local scheduler nodes. Each fragment of the execution plan can include one or more operations to be performed by worker nodes associated with a particular local scheduler node. Thus, the local scheduler nodes can be configured to coordinate the execution of the plan fragments by the worker nodes associated with the individual local scheduler nodes. For example, a local scheduler node can distribute, to the appropriate worker nodes, the various operations included in a fragment of the execution plan received at the local scheduler node. Moreover, the local scheduler node can route updates associated with the execution of the plan fragment between the various worker nodes associated with that local scheduler node.

In some implementations of the current subject matter, the hierarchy associated with the distributed database system can include multiple layers of local scheduler nodes. For instance, the global scheduler node can distribute fragments of an execution plan to one or more local scheduler nodes at a top level of the hierarchy. The local scheduler nodes at the top level of the hierarchy can then distribute sub-fragments of the execution plan to local scheduler nodes at a next level of the hierarchy. According to some implementations of the current subject matter, fragments and sub-fragments of the execution plan can be routed through local scheduler nodes at various levels of the hierarchy until the operations in the execution plan are distributed to the appropriate worker nodes (e.g., by the local scheduler nodes at a bottom level of the hierarchy).

In some implementations of the current subject matter, the hierarchy of global scheduler nodes, local scheduler nodes, and worker nodes can be static. That is, the connections between the global scheduler nodes, local scheduler nodes, and worker nodes are fixed and remain open unless the distributed database system undergoes structural changes including, for example, the addition, removal, and/or replacement of one or more of a global scheduler node, local scheduler node, and worker node. Moreover, the local scheduler nodes are configured to route messages between various worker nodes, thereby obviating any direction connections between the worker nodes in the distributed database system. Accordingly, the distributed database system can execute a query using a minimal number of established connections instead of having to establish connections at runtime and/or attempt to pool connections across different queries.

FIG. 1 depicts a network diagram illustrating a distributed database system 100 consistent with implementations of the current subject matter. Referring to FIG. 1, the distributed database system 100 can include a j number of nodes (e.g., $n_1$ through $n_j$). The nodes $n_1$ through $n_j$ can be communicatively coupled via a wired and/or wireless network 120. Furthermore, a client 130 can also communicate with the distributed database system 100 via the wired and/or wireless network 120. The wired and/or wireless network 120 can be a wide area network (WAN), a local area network (LAN), and/or the Internet. The distributed database system 100 can include any number of nodes without departing from the scope of the present disclosure.

The client 130 can submit a query to the distributed database system 100. Data in the distributed database system 100 can be stored at and/or managed by several different nodes (e.g., two or more of the nodes $n_1$ through $n_j$). For instance, the query from the client 130 may be a request to retrieve data (e.g., SELECT) from a database table that is stored in and/or managed by two or more of the nodes $n_1$ through $n_j$. As such, executing the query from the client 130 can require a coordination of operations performed by two or more of the nodes $n_1$ through $n_j$.

In some implementations of the current subject matter, the nodes $n_1$ through $n_j$ can form a static hierarchy in which each node can be designated to serve as a global scheduler node, a local scheduler node, or a worker node. A global scheduler node can be configured to generate an execution plan for the query (e.g., from the client 130) and distribute fragments of the execution plan to one or more local scheduler nodes. Meanwhile, a local scheduler node can receive a plan fragment from the global scheduler node and coordinate the execution of the plan fragment by the worker nodes assigned to the local scheduler node.

According to some implementations of the current subject matter, communications between the global and local scheduler nodes (e.g., to coordinate the execution of the query from the client 130) can be conducted over one or more of the established connections that remain open. Moreover, communications between two or more worker nodes assigned to a single local scheduler node are conducted via the local scheduler node using established connections between the local scheduler node and the worker nodes.

Figure 2A:
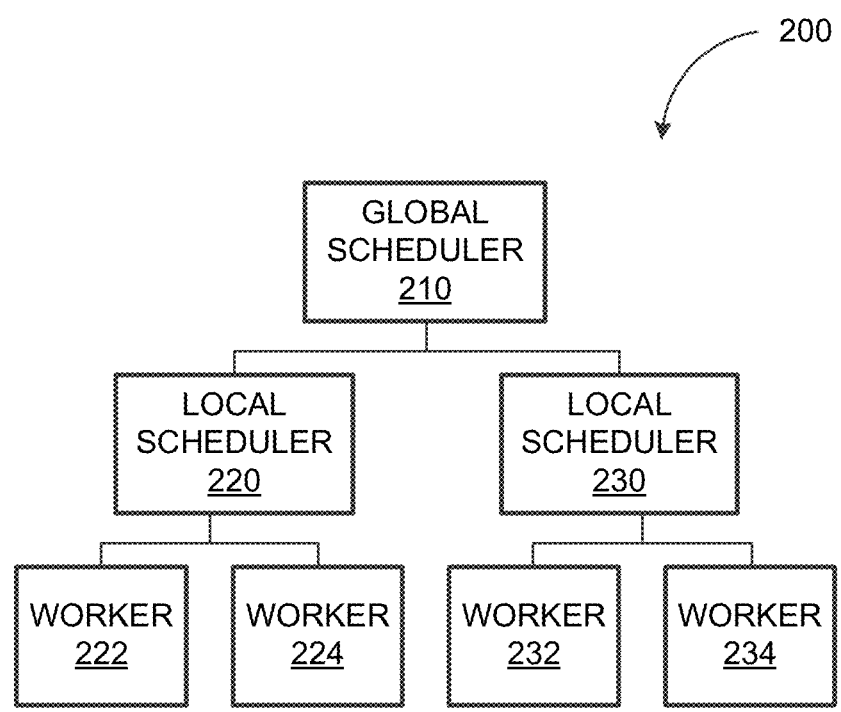
FIG. 2A depicts an static hierarchy consistent with implementations of the current subject matter.

FIG. 2A depicts a static hierarchy 200 consistent with implementations of the current subject matter. Referring to FIGS. 1-2A, the nodes $n_1$ through $n_j$ of the distributed database system 100 can form the static hierarchy 200.

In some implementations of the current subject matter, the static hierarchy 200 can include a global scheduler node 210, a first local scheduler node 220, and a second local scheduler node 230. The global scheduler node 210 can have an established connection with each of the first local scheduler node 220 and the second local scheduler node 230. Referring again to FIG. 2A, the static hierarchy 200 can further include a plurality of worker nodes including, for example, a first worker node 222, a second worker node 224, a third worker node 232, and a fourth worker node 234. As shown in FIG. 2A, the first worker node 222 and the second worker node 224 can be assigned to the first local scheduler node 220. As such, the first local scheduler node 220 can have an established connection with the first worker node 222 and an established connection with the second worker node 224. Meanwhile, the third worker node 232 and the fourth worker node 234 can be assigned to the second scheduler node 230. The second scheduler node 230 can have an established connection with each of the third worker node 232 and the fourth worker node 234.

According to some implementations of the current subject matter, the global scheduler node 210 can be configured to respond to queries on data that is stored at and/or managed by one or more of the first worker node 222, the second worker node 224, the third worker node 232, and the fourth worker node 234. As such, the global scheduler node 210 can generate an execution plan for a query. The global scheduler node 210 can further distribute, via the established connections, fragments of the execution plan to the appropriate local scheduler nodes (e.g., the first local scheduler node 220 and/or the second local scheduler node 230). Each fragment of the execution plan can include one or more operations to be performed by the worker nodes assigned to a local scheduler node.

For instance, for a query on data stored at and/or managed by the first worker node 222 and the second worker node 224, the global scheduler node 210 may distribute a fragment of the execution plan to the first local scheduler node 220. By contrast, for a query on data stored at and/or managed by the first worker node 222 and the third worker node 232, the global scheduler node 210 may distribute a plan fragment to the first local scheduler node 220 and another plan fragment to the second local scheduler node 230.

The local scheduler nodes can be configured to coordinate the execution of the plan fragments by the worker nodes assigned to each local scheduler node. For example, the first local scheduler node 220 can receive, from the global scheduler node 210, a fragment of the execution plan. The first local scheduler node 220 distribute, via the established connections, the operations included in the plan fragment to one or more of the worker nodes assigned to the first local scheduler node 220 (e.g., the first worker node 222 and/or the second worker node 224). According to some implementations of the current subject matter, there are no open connections between the first worker node 222 and the second worker node 224. Thus, updates exchanged between the first worker node 222 and the second worker node 224 during execution of the plan fragment can be routed by the first local scheduler node 220 via the established connections between the first local scheduler node 220 and each of the first worker node 222 and the second worker node 224.

Alternately or additionally, the second local scheduler node 230 can receive, from the global scheduler node 210, a fragment of the execution plan. The second local scheduler node 230 distribute, via the established connections, the operations included in the plan fragment to one or more of the worker nodes assigned to the second local scheduler node 230 (e.g., the third worker node 232 and/or the fourth worker node 234). As there are no open connections between the third worker node 232 and the fourth worker node 234, the second local scheduler node 230 can be further configured to route updates between the third worker node 232 and the fourth worker node 234 via the established connections between the second local scheduler node 230 and each of the third worker node 232 and the fourth worker node 234.

The static hierarchy 200 can include a different number of global scheduler nodes, local scheduler nodes, and/or worker nodes than shown without departing from the scope of the present disclosure. For example, the number nodes designated to serve as global scheduler nodes and local scheduler nodes can be determined based on a ratio derived from the following equation (1):

$$\frac{\text{number of global scheduler nodes}}{\text{number of local scheduler nodes}} \quad (1)$$

The number of nodes designated to worker nodes and local scheduler nodes can be determined based on a ratio derived from the following equation (2):

$$\frac{\text{number of worker nodes}}{\text{number of local scheduler nodes}} \quad (2)$$

It should be appreciated that any number of local scheduler nodes can be assigned to a global scheduler node without departing from the scope of the present disclosure. Similarly, any number of worker nodes can be assigned to a local scheduler node without departing from the scope of the present disclosure. In some implementations of the current subject matter, the number of local scheduler nodes assigned to a global scheduler node and/or the number of worker nodes assigned to a local scheduler node can be determined based on factors including, for example, load balancing and data locality. For instance, worker nodes that store and/or manage data belonging to a same database table may be assigned to the same local scheduler node.

Figure 2B:
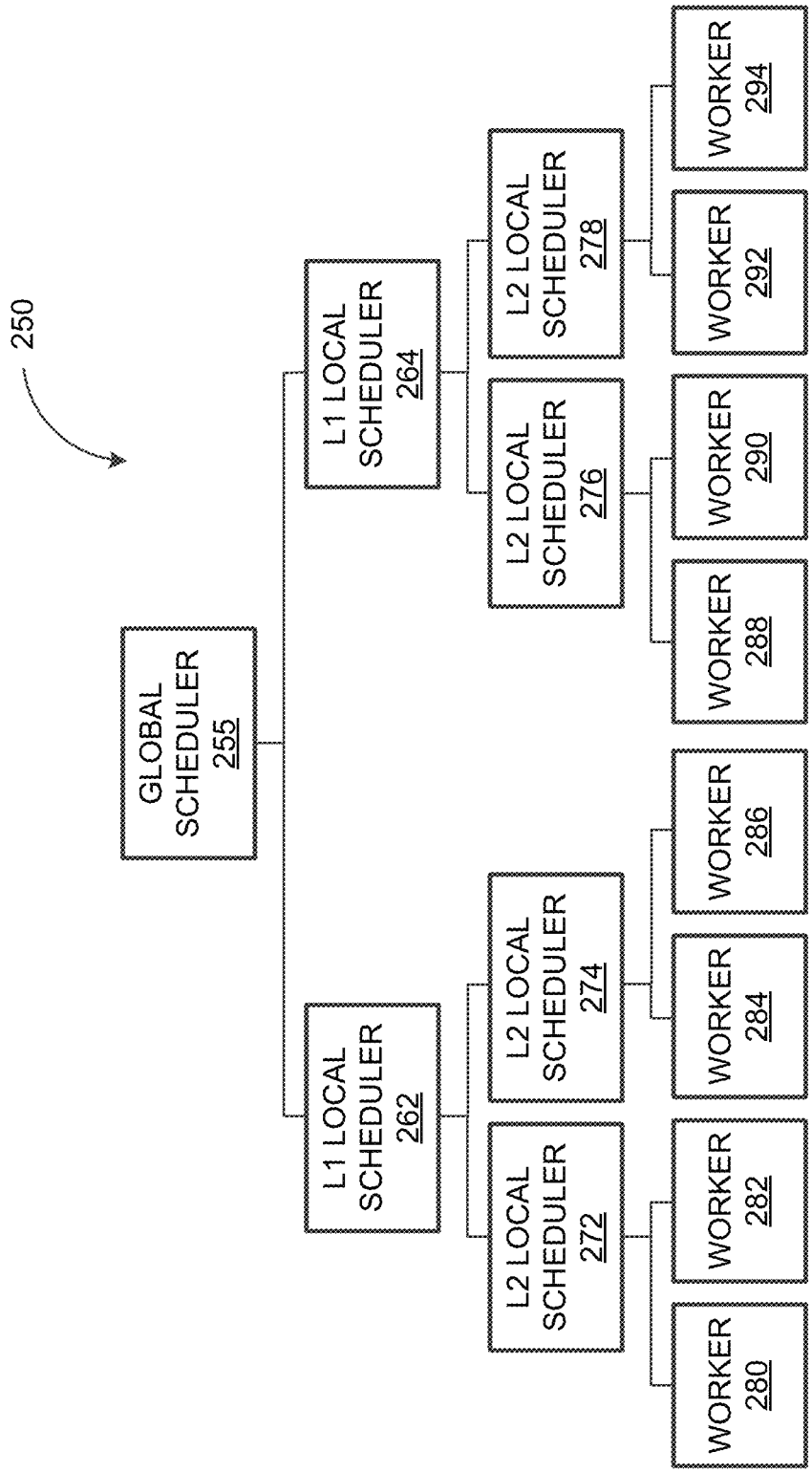
FIG. 2B depicts a static hierarchy consistent with implementations of the current subject matter.

FIG. 2B depicts a static hierarchy 250 consistent with implementations of the current subject matter. Referring to FIGS. 1 and 2B, the nodes $n_1$ through $n_j$ of the distributed database system 100 can form the static hierarchy 250.

In some implementations of the current subject matter, the static hierarchy 250 can include a global scheduler node 255. The static hierarchy 250 can further include multiple levels of local scheduler nodes including, for example, a first level L1 and a second level L2. For instance, as shown in FIG. 2B, the static hierarchy 250 can include a first L1 local scheduler node 262 and a second L1 local scheduler node 264. The global scheduler node 255 can have established connections with each of the first L1 local scheduler node 262 and the second L1 local scheduler node 264.

The static hierarchy 250 can further include a first L2 local scheduler node 272, a second L2 local scheduler node 274, a third L2 local scheduler node 276, and a fourth L2 local scheduler node 278. Each local scheduler node in the second level L2 of the static hierarchy 250 can be assigned to a local scheduler node in the first level L1 of the static hierarchy 250. For example, as shown in FIG. 2B, the first L2 local scheduler node 272 and the second L2 local scheduler node 274 can be assigned to the first L1 local scheduler node 262. As such, the first L1 local scheduler node 262 can have established connections with each of the first L2 local scheduler node 272 and the second L2 local scheduler node 274. Meanwhile, the third L2 local scheduler node 276 and the fourth L2 local scheduler node 278 can be assigned to the second L2 local scheduler node 264. The second L1 local scheduler node 264 can have established connections with each of the third L2 local scheduler node 276 and the fourth L2 local scheduler node 278.

In addition, the static hierarchy 250 can include a plurality of worker nodes including, for example, a first worker node 280, a second worker node 282, a third worker node 284, a fourth worker node 286, a fifth worker node 288, a sixth worker node 290, a seventh worker node 292, and an eighth worker node 294. As shown in FIG. 2B, each of the worker nodes can be assigned to and have an established connection with a local scheduler node in the second level L2 of the static hierarchy 250. For instance, the first worker node 280 and the second worker node 282 can be assigned to the first L2 local scheduler node 272 while the third worker node 284 and the fourth worker node 286 can be assigned to the second L2 local scheduler node 274.

In some implementations of the current subject matter, the global scheduler node 255 can generate an execution plan (e.g., for a query) and distribute fragments of the execution plan to the local scheduler nodes in the first level L1 of the static hierarchy 250 including, for example, the first L1 local scheduler node 262 and/or the second L1 local scheduler node 264. The local scheduler nodes in the first level L1 of the static hierarchy 250 can further distribute sub-fragments of the execution plan to one or more of the local scheduler nodes in the second level L2 of the static hierarchy 250. For instance, the first L1 local scheduler node 262 can receive a plan fragment from the global scheduler node 255 and distribute one or more sub-fragments of the execution plan to the first L2 local scheduler node 272 and/or the second L2 local scheduler node 274. Alternately or additionally, the second L1 local scheduler node 262 can receive a plan fragment from the global scheduler node 255 and distribute one or more sub-fragments of the execution plan to the third L2 local scheduler node 276 and/or the fourth L2 local scheduler node 278.

The local scheduler nodes at the second level L2 of the static hierarchy 250 can be configured to coordinate the execution of various sub-fragments of the execution plan by the worker nodes that are assigned to each local scheduler node at the second level L2. For instance, the local scheduler nodes at the second level L2 can distribute the operations included in the sub-fragments of the execution plan to the appropriate worker nodes. In addition, the local scheduler nodes at the second level L2 of the static hierarchy can be further configured to route, via established connections, updates associated with the execution of the sub-fragments between the worker nodes.

For example, the first L2 local scheduler node 272 can be configured to coordinate the execution of a sub-fragment of the execution plan including by distributing the operations included in the sub-fragment to the first worker node 280 and/or the second worker node 282. Furthermore, the first L2 local scheduler node 272 can be configured to route updates associated with the execution of the sub-fragment between the first worker node 280 and the second worker node 282. Routing the updates via the established connections between the first L2 local scheduler node 272 and each of the first worker node 280 and the second worker node 282 obviates any direct connections between the first worker node 280 and the second worker node 282.

It should be appreciated that the static hierarchy 250 can include additional layers of local scheduler nodes without department from the scope of the present disclosure. The static hierarchy 250 can further include a different number of global scheduler nodes, local scheduler nodes, and/or worker nodes than shown without departing from the scope of the present disclosure. Moreover, any number of local scheduler nodes can be assigned to a global scheduler node without departing from the scope of the present disclosure. Similarly, any number of worker nodes or local scheduler nodes can be assigned to another local scheduler node without departing from the scope of the present disclosure.

Figure 3A:
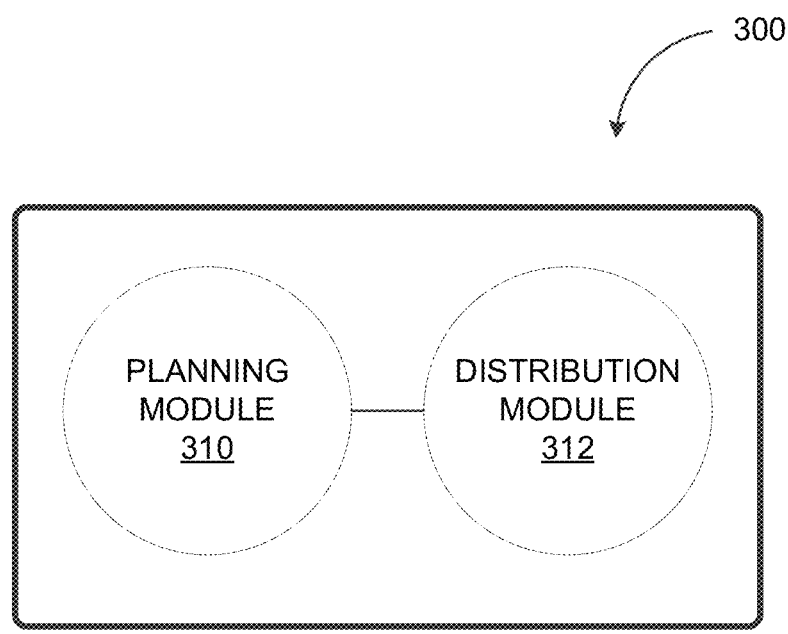
FIG. 3A depicts a block diagram illustrating a global scheduler node consistent with implementations of the current subject matter.

FIG. 3A depicts a block diagram illustrating a global scheduler node 300 consistent with implementations of the current subject matter. Referring to FIGS. 2A-B and 3A, the global scheduler node 300 can include the functionalities of the global scheduler node 210 and/or the global scheduler node 255.

As shown in FIG. 3A, the global scheduler node 300 can include a programmable processor and/or computer hardware configured to implement a planning module 310 and a distribution module 312. Alternately or additionally, the global scheduler node 300 (e.g., the planning module 310, the distribution module 312) can be a virtual node implemented on one or more programmable processors.

In some implementations of the current subject matter, the planning module 310 can be configured to generate an execution plan for a query on data that is stored at and/or managed by multiple worker nodes. For example, the planning module 310 can generate an execution plan for a query on data that is stored at and/or managed by the first worker node 222, the second worker node 224, the third worker node 232, and/or the fourth worker node 234. Thus, the execution plan for a query can include a plurality of operations, which are to be performed by one or more worker nodes in a distributed database system.

According to some implementations of the current subject matter, worker nodes are assigned to different local scheduler nodes to form a hierarchy (e.g., the hierarchy 200, the hierarchy 250). As such, the planning module 310 can be further configured to partition the execution plan into a plurality of fragments based on the assignment of worker nodes to one or more local scheduler nodes. The distribution module 312 can be configured to distribute the fragments of the execution plan to the appropriate local scheduler nodes. Distributing a fragment of the execution plan to a local scheduler node delegates the plan fragment to that local scheduler node such that the local scheduler node can coordinate the performance of the tasks in the plan fragment by the lower level local scheduler nodes and/or worker nodes associated with that local scheduler node.

Figure 3B:
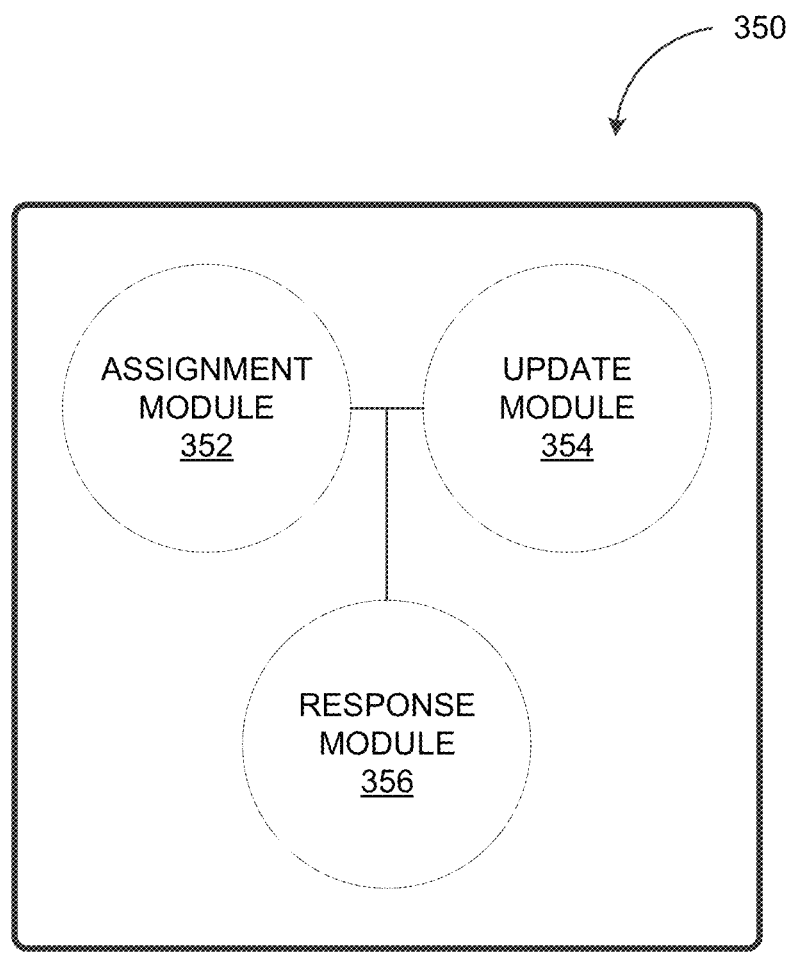
FIG. 3B depicts a block diagram illustrating a local scheduler node consistent with implementations of the current subject matter.

FIG. 3B depicts a block diagram illustrating a local scheduler node 350 consistent with implementations of the current subject matter. Referring to FIGS. 2A-B and 3B, the local scheduler node 350 can include the functionalities of the first local scheduler node 220, the second local scheduler node 230, the first L1 local scheduler node 262, the second L1 local scheduler node 264, the first L2 local scheduler node 272, the second L2 local scheduler node 274, the third L2 local scheduler node 276, and/or the fourth L2 local scheduler node 278.

As shown in FIG. 3B, the local scheduler node 350 can include a programmable processor and/or computer hardware configured to implement an assignment module 352, an update module 354, and a response module 356. Alternately or additionally, the scheduler node 300 (e.g., the assignment module 352, the update module 354, and the response module 356) can be a virtual node implemented on one or more programmable processors.

In some implementations of the current subject matter, the assignment module 352 can be configured to distribute various portions (e.g., fragments, sub-fragments) of an execution plan to the appropriate local scheduler nodes or worker nodes. For example, if the local scheduler node 350 is an intermediate level local scheduler node (e.g., the first L1 local scheduler node 262, the second L1 local scheduler node 264), the assignment module 352 can be configured to distribute sub-fragments of an execution plan to one or more local scheduler nodes at a next level of a static hierarchy (e.g., the static hierarchy 250). As an intermediate local scheduler node, the local scheduler node 350 can be associated with one or more local scheduler nodes at the next level of the static hierarchy. Each sub-fragment of the execution plan can include operations to be performed by worker nodes assigned to the local scheduler nodes at the next level of the static hierarchy. Thus, the assignment module 352 can distribute the sub-fragments based on the assignment of worker nodes to various local scheduler nodes at the next level of the static hierarchy.

Alternately, if the local scheduler node 350 is serving as a bottom level local scheduler node (e.g., the first L2 local scheduler node 272, the second L2 local scheduler node 274, the third L2 local scheduler node 276, the fourth L2 local scheduler node 278), the assignment module 352 can be configured to distribute operations in a fragment or sub-fragment of an execution plan to the worker nodes associated with the local scheduler node 350.

Meanwhile, the update module 354 can be configured to route updates between lower level local scheduler nodes and/or worker nodes. If the local scheduler node 350 is serving as a higher level local scheduler node, the update module 354 can be configured to route updates associated with the execution of a fragment of an execution plan between two or more lower level local scheduler nodes. For instance, the update module 354 of the first L1 local scheduler node 262 can be configured to route updates between the first L2 local scheduler node 272 and the second L2 local scheduler node 274.

Alternately, if the local scheduler node 350 is serving as a bottom level local scheduler node, the update module 354 can be configured to route updates between two or more worker nodes. For example, the update module 354 of the first L2 local scheduler node 272 can be configured to route updates between the first worker node 280 and the second worker node 282. These updates can be associated with the performance of the operations assigned to the first worker node 280 and the second worker node 282.

In some implementations of the current subject matter, the response module 354 can be configured to gather, from one or more lower level local scheduler nodes or worker nodes, the results and/or outcome associated with the execution of various fragments and/or sub-fragments of the execution plan. The response module 314 can be further configured to forward, with or without additional processing, these results and/or outcomes to a higher level local scheduler node or a global scheduler node. For example, the response module 354 of the first L1 local scheduler node 262 can be configured to collect, from the first L2 local scheduler node 272 and/or the second L2 local scheduler node 274, the results and/or outcome associated with the execution of various sub-fragments of an execution plan. Meanwhile, the response module 354 of the first L2 local scheduler node 272 can be configured to collect, from the first worker node 280 and/or the second worker node 282, the result and/or outcome associated with the operations assigned to the first worker node 280 and/or the second worker node 282.

Figure 4:
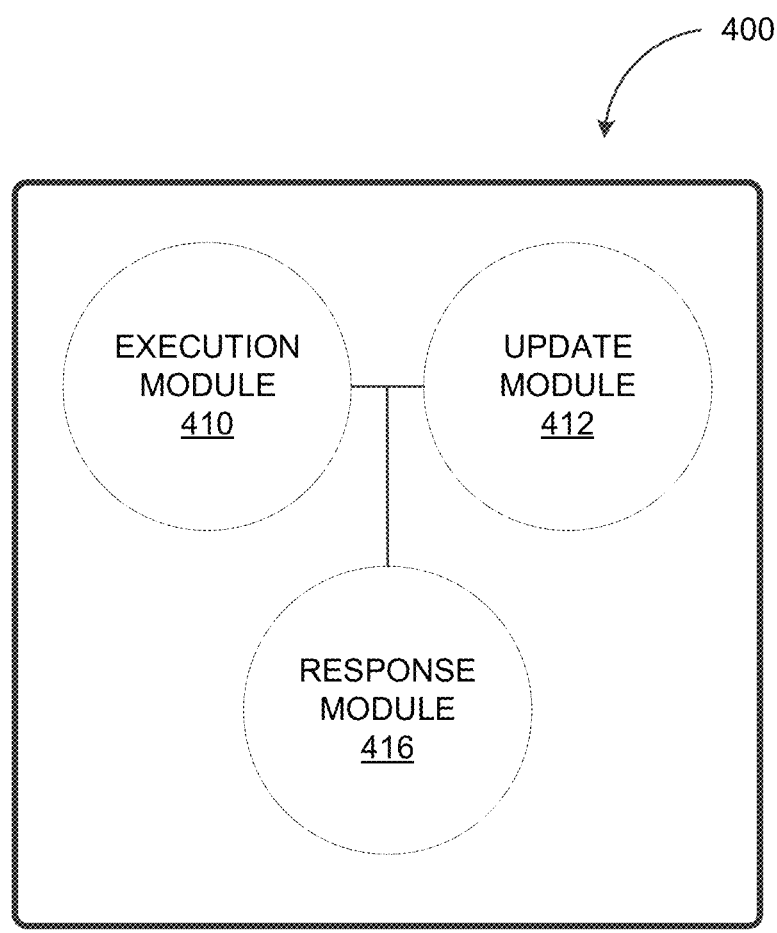
FIG. 4 depicts a block diagram illustrating a worker node consistent with implementations of the current subject matter.

FIG. 4 depicts a block diagram illustrating a worker node 400 consistent with implementations of the current subject matter. Referring to FIGS. 2A-B and 3-4, the worker node 400 can include the functionalities of the first worker node 222, the second worker node 224, the third worker node 232, and/or the fourth worker node 234 of the static hierarchy 200. Alternately or additionally, the worker node 400 can include the functionalities of the first worker node 280, the second worker node 282, the third worker node 284, the fourth worker node 286, the fifth worker node 288, the sixth worker node 290, the seventh worker node 292, and/or the eighth worker node 294 of the static hierarchy 250.

As shown in FIG. 4, the worker node 400 can include a programmable processor and/or computer hardware configured to implement an execution module 410, an update module 412, and a response module 414. Alternately or additionally, the worker node 400 (e.g., the execution module 410, the update module 412, and the response module 414) can be a virtual node implemented on one or more programmable processors.

In some implementations of the current subject matter, the execution module 410 can be configured to perform, as required by an execution plan, one or more operations on data stored at and/or managed by the worker node 400. For instance, the execution module 410 of the first worker node 222 can be configured to perform the operations assigned to the first worker node 222 by the first local scheduler node 220. Similarly, the execution module 410 of the first worker node 280 can be configured to perform the operations assigned to the first worker node 280 by the first L2 local scheduler node 272.

The update module 412 can be configured to provide updates associated with the performance of the operations by the worker node 400. For instance, the update module 412 can be configured to provide the updates to the local scheduler node associated with the worker node 400. The update module 412 can be further configured to provide updates to one or more other worker nodes associated with the same local scheduler node. According to some implementations of the current subject matter, the update module 412 can be configured to provide the updates to other worker nodes via the local scheduler node associated with the worker node 400. Thus, the update module 412 can provide the updates to the local scheduler node instead of directly to the other worker nodes. As such, the worker node 400 is able to execute the operations assigned to the worker node 400 without requiring any direction connections with the other worker nodes.

For example, the update module 412 of the first worker node 222 can be configured to provide updates to the second worker node 224 by sending the updates via the first local scheduler node 220. Similarly, the update module 412 of the first worker node 280 can be configured to provide updates to the second worker node 282 by sending the updates via the first L2 local scheduler node 272.

The response module 414 can be configured to provide a result and/or outcome of the operations assigned to the worker node 400. In some implementations of the current subject matter, the response module 414 can be configured to provide the result and/or outcome of the operations to the local scheduler node assigned to the worker node 400. For example, the response module 414 of the first worker node 222 can be configured to provide, to the first local scheduler node 222, a result and/or outcome of the operations performed by the execution module 410 of the first worker node 222. Meanwhile, the response module 414 of the first worker node 280 can be configured to provide, to the first L2 local scheduler node 272, a result and/or outcome of the operations performed by the execution module 410 of the first worker node 280.

Figure 5:
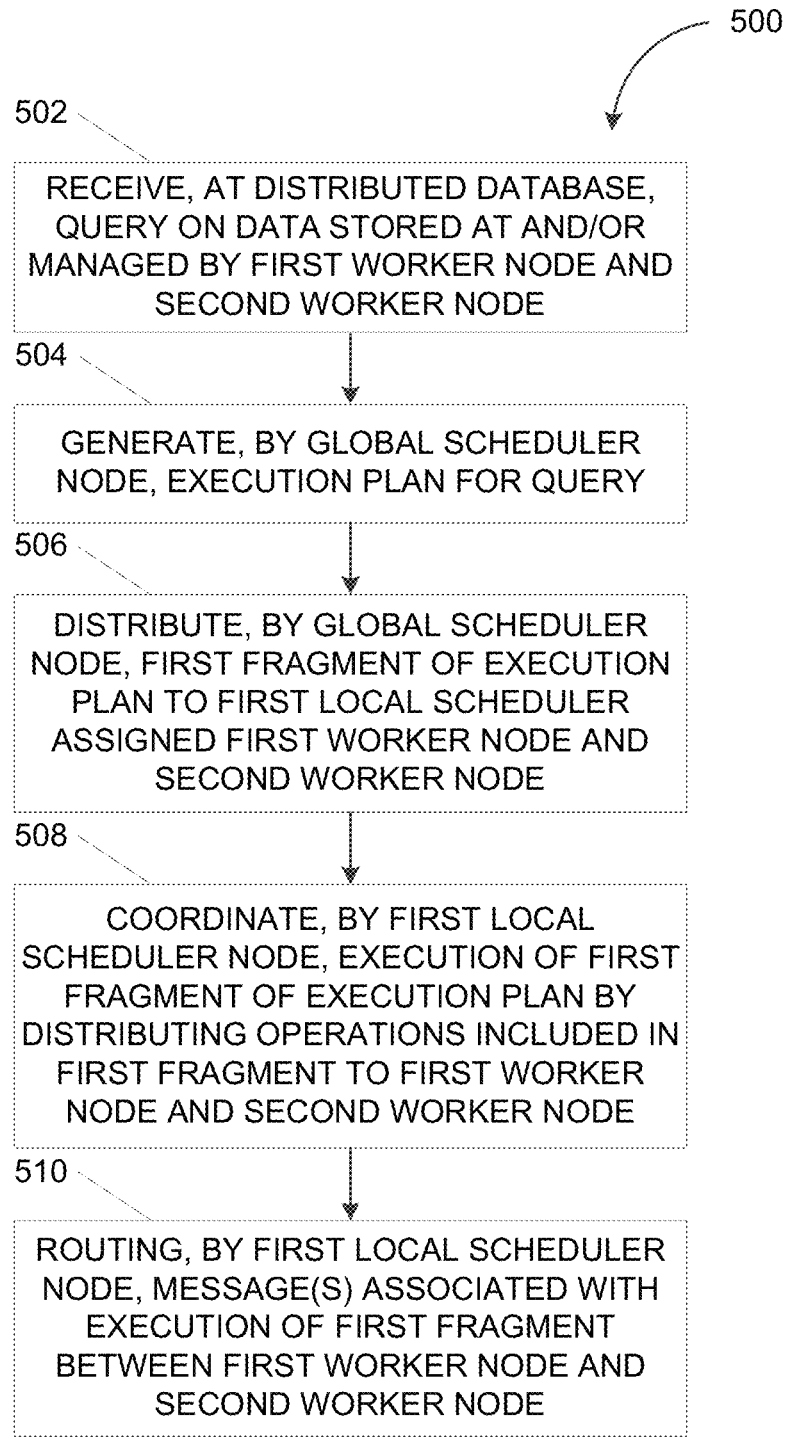
FIG. 5 depicts a flowchart illustrating a process for executing a query consistent with implementations of the current subject matter.

FIG. 5 depicts a flowchart illustrating a process 500 for executing a query consistent with implementations of the current subject matter. Referring to FIGS. 1-5, the process 500 can be performed by a distributed database system having a plurality of nodes including, for example, the distributed database system 100.

The distributed database system 100 can receive, from the client 130, a query on data stored at and/or managed by at least a first worker node and a second worker node in the distributed database system 100 (502). For example, the distributed database system 100 may receive, from the client 130, a query (e.g., a SELECT operation) that requires retrieval of data from a database table stored at and/or managed by the first worker node 222, the second worker node 224, the third worker node 232, and/or the fourth worker node 234.

In response to the query, a global scheduler node of the distributed database system 100 can generate an execution plan for the query (504). The global scheduler node of the distributed database system 100 can further distribute, based on an assignment of worker nodes to one or more local scheduler nodes, a first fragment of the execution plan to a first local scheduler that is assigned the first worker node and the second worker node (506). For example, the execution plan for the query can include operations to be performed by the first worker node 222, the second worker node 224, the third worker node 232, and/or the fourth worker node 234. As the execution plan is routed via one or more local scheduler nodes, the global scheduler node 210 can partition the execution plan into fragments based on the assignment of worker nodes to various local scheduler nodes. The fragments of the execution plan are then distributed, via established connections, to the appropriate local scheduler nodes (e.g., the first local scheduler node 220, the second local scheduler node 230) based on the assignment of worker nodes to one or more local scheduler nodes.

The first local scheduler can coordinate the execution of the first fragment of the execution plan by at least distributing, to the first worker node and the second worker node, one or more operations included in the first fragment of the execution plan (508). The first local scheduler node can further coordinate the execution of the first fragment of the execution plan by routing at least one message associated with the execution of the first fragment between the first worker node and the second worker node (510). For example, the first local scheduler 220 can assign the operations included in the first fragment of the execution plan to the first worker node 222 and/or the second worker node 224. The assignment of operations may be based on the respective data that is stored at and/or managed by the first and second worker node. Moreover, the first local scheduler 220 can be further configured to route updates associated with the execution of the first fragment of the execution plan between the first worker node 222 and the second worker node 224.

Figure 6:
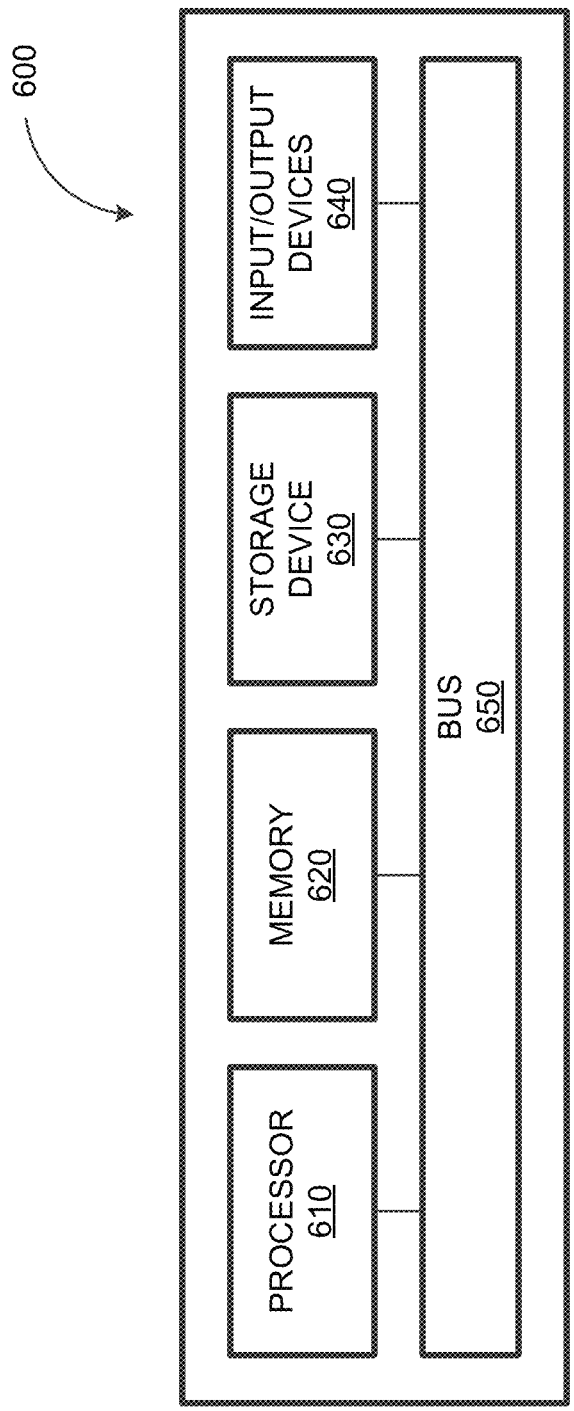
FIG. 6 depicts a block diagram illustrating a computing system consistent with implementations of the current subject matter.

FIG. 6 depicts a block diagram illustrating a computing system 600 consistent with implementations of the current subject matter. Referring to FIGS. 1-6, the computing system 600 can be used to implement the global scheduler node 300, the local schedule node 350, and/or the worker node 400.

As shown in FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more components of, for example, the global scheduler node 300, the local schedule node 350, and/or the worker node 400. In some implementations of the current subject matter, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a floppy disk device, a hard disk device, an optical disk device, or a tape device, or other suitable persistent storage means. The input/output device 640 provides input/output operations for the computing system 600. In some implementations of the current subject matter, the input/output device 640 includes a keyboard and/or pointing device. In various implementations, the input/output device 640 includes a display unit for displaying graphical user interfaces.

According to some implementations of the current subject matter, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A distributed database system, comprising:
a global scheduler node implemented on at least one programmable processor and configured to perform operations comprising:
executing a query by at least generating an execution plan for the query, the query requiring data stored at a first worker node and a second worker node, and the execution plan including at least a first fragment having operations to be performed by the first worker node and the second worker node; and
a first local scheduler node implemented on at least one programmable processor and configured to perform operations comprising executing the query by at least coordinating an execution of at least a portion of the first fragment of the execution plan, the global scheduler node, the first local scheduler node, the first worker node, and the second worker node forming a static hierarchy, the static hierarchy including a fixed quantity of connections that are configured to remain open, the fixed quantity of connections including a first connection between the global scheduler node and the first local scheduler node, a second connection between the first local scheduler node and the first worker node, and a third connection between the first local scheduler node and the second worker node, the coordinating comprising:
receiving, from the global scheduler node, at least the first fragment of the execution plan, the first fragment of the execution plan being routed from the global scheduler node to the first local scheduler node through the first connection;
distributing, to the first worker node and the second worker node, operations included in the first fragment of the execution plan, the operations included in the first fragment of the execution plan being distributed to the first worker node using the second connection, and the operations included in the first fragment of the execution plan being distributed to the second worker node using the third connection; and
routing, between the first worker node and the second worker node, at least one message associated with the execution the first fragment of the execution plan, the at least one message being routed indirectly, via the local scheduler node, between the first worker node and the second worker node, the at least one message being routed indirectly through the second connection and the third connection, and the at least one message being routed without modifying the static hierarchy to include a direct connection, between the first worker node and the second worker node for routing the at least one message.

2. The distributed database system of claim 1, wherein the query further requires data stored at a third worker node assigned to a second local scheduler node.

3. The distributed database system of claim 2, wherein the global scheduler node is further configured to distribute, to the second local scheduler node, a second fragment of the execution plan, and wherein the second local scheduler node is configured to coordinate the execution of the second fragment of the execution plan.

4. The distributed database system of claim 1, wherein the distributed database system further comprises a second local scheduler node, wherein the second local scheduler node comprises a higher level local scheduler node and the first local scheduler node comprises a lower level local scheduler node assigned to the second local scheduler node.

5. The distributed database of claim 4, wherein the global scheduler node is configured to distribute the first fragment of the execution plan to the second local scheduler node, and wherein the second local scheduler node is configured to coordinate the execution of the first fragment by at least distributing, to the first local scheduler node, the portion of the first fragment of the execution plan.

6. A method, comprising:
executing, by a global scheduler node, a query by at least generating an execution plan for the query, the query requiring data stored at a first worker node and a second worker node assigned to a first local scheduler node, and the execution plan including at least a first fragment having operations to be performed by the first worker node and the second worker node;
executing, by the first local scheduler node, the query by at least coordinating an execution of at least a portion of the first fragment of the execution plan, the global scheduler node, the first local scheduler node, the first worker node, and the second worker node forming a static hierarchy, the static hierarchy including a fixed quantity of connections that are configured to remain open, the fixed quantity of connections including a first connection between the global scheduler node and the first local scheduler node, a second connection between the first local scheduler node and the first worker node, and a third connection between the first local scheduler node and the second worker node, the coordinating comprising:

receiving, from the global scheduler node, at least the first fragment of the execution plan, the first fragment of the execution plan being routed from the global scheduler node to the first local scheduler node through the first connection;

distributing, to the first worker node and the second worker node, operations included in the first fragment of the execution plan, the operations included in the first fragment of the execution plan being distributed to the first worker node using the second connection, and the operations included in the first fragment of the execution plan being distributed to the second worker node using the third connection; and routing, between the first worker node and the second worker node, at least one message associated with the execution the first fragment of the execution plan, the at least one message being routed indirectly, via the local scheduler node, between the first worker node and the second worker node, the at least one message being routed indirectly through the second connection and the third connection, and the at least one message being routed without establishing, between the first worker node and the second worker node, a direct connection for routing the at least one message.

7. The method of claim 6, wherein the query further requires data stored at a third worker node assigned to a second local scheduler node.

8. The method of claim 7, further comprising:
   distributing, by the global scheduler node, a second fragment of the execution plan to the second local scheduler node, wherein the second local scheduler node is configured to coordinate the execution of the second fragment of the execution plan.

9. The method of claim 6, wherein the first local scheduler node comprises a lower level local scheduler node assigned to a second local scheduler node, and wherein the second local scheduler node comprises a higher level local scheduler node.

10. The method of claim 9, further comprising:
   distributing, by the global scheduler node, the first fragment of the execution plan to the second local scheduler node; and
   coordinating, by the second local scheduler node, an execution of the first fragment of the execution plan, the coordinating comprises distributing, to the first local scheduler node, the portion of the first fragment of the execution plan.

11. A computer program product comprising a non-transitory machine-readable medium storing instructions that, when executed by at least one programmable processor, cause the at least one programmable processor to perform operations comprising:
   executing, by a global scheduler node, a query by at least generating an execution plan for the query, the query requiring data stored at a first worker node and a second worker node assigned to a first local scheduler node, and the execution plan including at least a first fragment having operations to be performed by the first worker node and the second worker node;
   executing, by the first local scheduler node, the query by at least coordinating an execution of at least a portion of the first fragment of the execution plan, the global scheduler node, the first local scheduler node, the first worker node, and the second worker node forming a static hierarchy, the static hierarchy including a fixed quantity of connections that are configured to remain open, the fixed quantity of connections including a first connection between the global scheduler node and the first local scheduler node, a second connection between the first local scheduler node and the first worker node, and a third connection between the first local scheduler node and the second worker node, the coordinating comprising:

receiving, from the global scheduler node, at least the first fragment of the execution plan, the first fragment of the execution plan being routed from the global scheduler node to the first local scheduler node through the first connection;

distributing, to the first worker node and the second worker node, operations included in the first fragment of the execution plan, the operations included in the first fragment of the execution plan being distributed to the first worker node using the second connection, and the operations included in the first fragment of the execution plan being distributed to the second worker node using the third connection; and routing, between the first worker node and the second worker node, at least one message associated with the execution the first fragment of the execution plan, the at least one message being routed indirectly, via the local scheduler node, between the first worker node and the second worker node, the at least one message being routed indirectly through the second connection and the third connection, and the at least one message being routed without establishing, between the first worker node and the second worker node, a direct connection for routing the at least one message.

12. The computer program product of claim 11, further comprising:
   distributing, by the global scheduler node, a second fragment of the execution plan to a second local scheduler node, when the query further requires data stored at a third worker node assigned to a second local scheduler node, wherein the second local scheduler node is configured to coordinate the execution of the second fragment of the execution plan.

13. The computer program product of claim 11, further comprising:
   distributing, by the global scheduler node, the first fragment of the execution plan to a second local scheduler node, when the first local scheduler node comprises a lower level local scheduler node assigned to the second local scheduler node and the second local scheduler node comprises a higher level local scheduler node; and
   coordinating, by the second local scheduler node, an execution of the first fragment of the execution plan, the coordinating comprises distributing, to the first local scheduler node, the portion of the first fragment of the execution plan.

* * * * *